(12) United States Patent
Schut

(10) Patent No.: US 9,862,324 B2
(45) Date of Patent: Jan. 9, 2018

(54) DRIVER LIFT DEVICE

(71) Applicant: Roy A. Schut, Brookings, SD (US)

(72) Inventor: Roy A. Schut, Brookings, SD (US)

( * ) Notice: Subject to any disclaimer, the term of this patent is extended or adjusted under 35 U.S.C. 154(b) by 0 days.

(21) Appl. No.: 15/204,571

(22) Filed: Jul. 7, 2016

(65) Prior Publication Data

US 2016/0339845 A1 Nov. 24, 2016

Related U.S. Application Data

(63) Continuation-in-part of application No. 14/719,489, filed on May 22, 2015, now Pat. No. 9,555,743.

(51) Int. Cl.
*B60R 3/02* (2006.01)
*B60P 1/44* (2006.01)

(52) U.S. Cl.
CPC .............. *B60R 3/02* (2013.01); *B60P 1/4421* (2013.01)

(58) Field of Classification Search
CPC ........ E02F 9/0833; B66B 9/00; B60P 1/4414; B60P 1/4421; B60P 1/4471; B60P 1/4478; B60R 3/02
See application file for complete search history.

(56) References Cited

U.S. PATENT DOCUMENTS

| | | | | |
|---|---|---|---|---|
| 2,640,612 A * | 6/1953 | Barry | .................... | B60P 1/4421 414/545 |
| 2,706,565 A * | 4/1955 | Krasno | ................. | B60P 1/4421 414/545 |
| 2,823,813 A * | 2/1958 | Shimmon | ............. | B60P 1/4421 414/541 |
| 3,024,926 A * | 3/1962 | Nolden | ................. | B60P 1/4421 414/545 |
| 3,282,449 A * | 11/1966 | Buford | .................. | B60P 1/4421 187/365 |
| 3,520,426 A * | 7/1970 | Hostetler | .............. | B60P 1/4421 414/545 |
| 3,675,739 A * | 7/1972 | Erlinder | ................ | B60P 1/4421 187/240 |
| 3,877,590 A * | 4/1975 | Brown | .................. | B60P 1/4421 187/244 |
| 3,887,092 A * | 6/1975 | Leet | ...................... | B60P 1/4421 187/243 |
| 4,071,260 A | 1/1978 | Marshall, Sr. | | |
| 4,133,437 A * | 1/1979 | Gates | .................... | B60P 1/4428 187/200 |

(Continued)

FOREIGN PATENT DOCUMENTS

DE 3618477 A14 12/1987
JP 11048867 A 2/1999

*Primary Examiner* — Katy M Ebner

(57) ABSTRACT

A driver lift device lifts a driver to enter an elevated cab on farm equipment or the like. The device includes an elongated post vertically mounted to a vehicle proximate an entry into a cab of the vehicle. Each of a top end and a bottom end of a pole is coupled to the post such that the pole is positioned in parallel spaced relationship to the post. Each of a plurality of rollers is coupled to a housing defining a vertical path through the housing. The pole extends through the vertical path. A foot support is coupled to the housing. A winch is coupled to the top end of the pole. A strap couples the housing to the winch whereby operation of the winch elevates and lowers the foot support on the pole.

15 Claims, 4 Drawing Sheets

(56) References Cited

U.S. PATENT DOCUMENTS

| | | | | |
|---|---|---|---|---|
| 4,243,120 A * | 1/1981 | Pratt, Jr. | ............... | B60R 3/02 182/127 |
| 4,252,492 A * | 2/1981 | Scothern | ............... | B60P 1/4485 187/244 |
| 4,324,317 A | 4/1982 | Winkelblech | | |
| 4,353,436 A * | 10/1982 | Rice | ............... | B60P 1/4421 187/200 |
| 4,563,121 A * | 1/1986 | Drews | ............... | B60P 1/4421 187/243 |
| 4,806,062 A * | 2/1989 | Stier | ............... | B60P 1/4421 292/126 |
| 4,915,573 A * | 4/1990 | Wapner | ............... | B66B 9/0823 414/540 |
| 5,064,022 A * | 11/1991 | Graham | ............... | B60R 3/02 182/127 |
| 5,092,617 A * | 3/1992 | Jones, Jr. | ............... | B60R 3/02 187/273 |
| 5,145,031 A * | 9/1992 | Sprunger | ............... | E06C 7/16 182/103 |
| 5,176,486 A * | 1/1993 | Park | ............... | B60P 1/4421 296/51 |
| 5,234,311 A * | 8/1993 | Loduha, Jr. | ............... | A61G 3/06 414/546 |
| 5,382,130 A * | 1/1995 | Kempf | ............... | A61G 3/06 14/71.3 |
| 5,513,943 A * | 5/1996 | Lugash | ............... | B60P 1/4421 187/244 |
| 5,529,453 A * | 6/1996 | La Gois | ............... | B60P 1/4421 254/280 |
| 5,755,309 A | 5/1998 | Harman et al. | | |
| 6,027,131 A | 2/2000 | Wijlhuizen | | |
| 7,380,769 B1 * | 6/2008 | Dorris | ............... | B60P 1/4407 254/323 |
| 7,546,902 B2 | 6/2009 | Schwertner | | |
| 7,806,647 B2 * | 10/2010 | Gomes | ............... | B60P 1/4421 414/545 |
| 8,011,474 B2 | 9/2011 | Boroski et al. | | |
| 8,308,177 B2 | 11/2012 | Fravel et al. | | |
| 8,668,048 B1 | 3/2014 | Morris | | |
| 9,028,195 B1 * | 5/2015 | Heynssens | ............... | B60P 1/4428 414/545 |
| 2004/0154870 A1 * | 8/2004 | Bass | ............... | B66B 7/02 187/270 |

\* cited by examiner

DRIVER LIFT DEVICE

CROSS-REFERENCE TO RELATED APPLICATIONS

This application is a continuation in part of pending utility patent application Ser. No. 14/719,489 filed on May 22, 2015.

BACKGROUND OF THE DISCLOSURE

Field of the Disclosure

The disclosure relates to lift devices and more particularly pertains to a new lift device for lifting a driver to enter an elevated cab on farm equipment or the like.

SUMMARY OF THE DISCLOSURE

An embodiment of the disclosure meets the needs presented above by generally comprising an elongated post vertically mounted to a vehicle proximate an entry into a cab of the vehicle. Each of a top end and a bottom end of a pole is coupled to the post such that the pole is positioned in parallel spaced relationship to the post. Each of a plurality of rollers is coupled to a housing defining a vertical path through the housing. The pole extends through the vertical path. A foot support is coupled to the housing. A winch is coupled to the top end of the pole. A strap couples the housing to the winch whereby operation of the winch elevates and lowers the foot support on the pole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
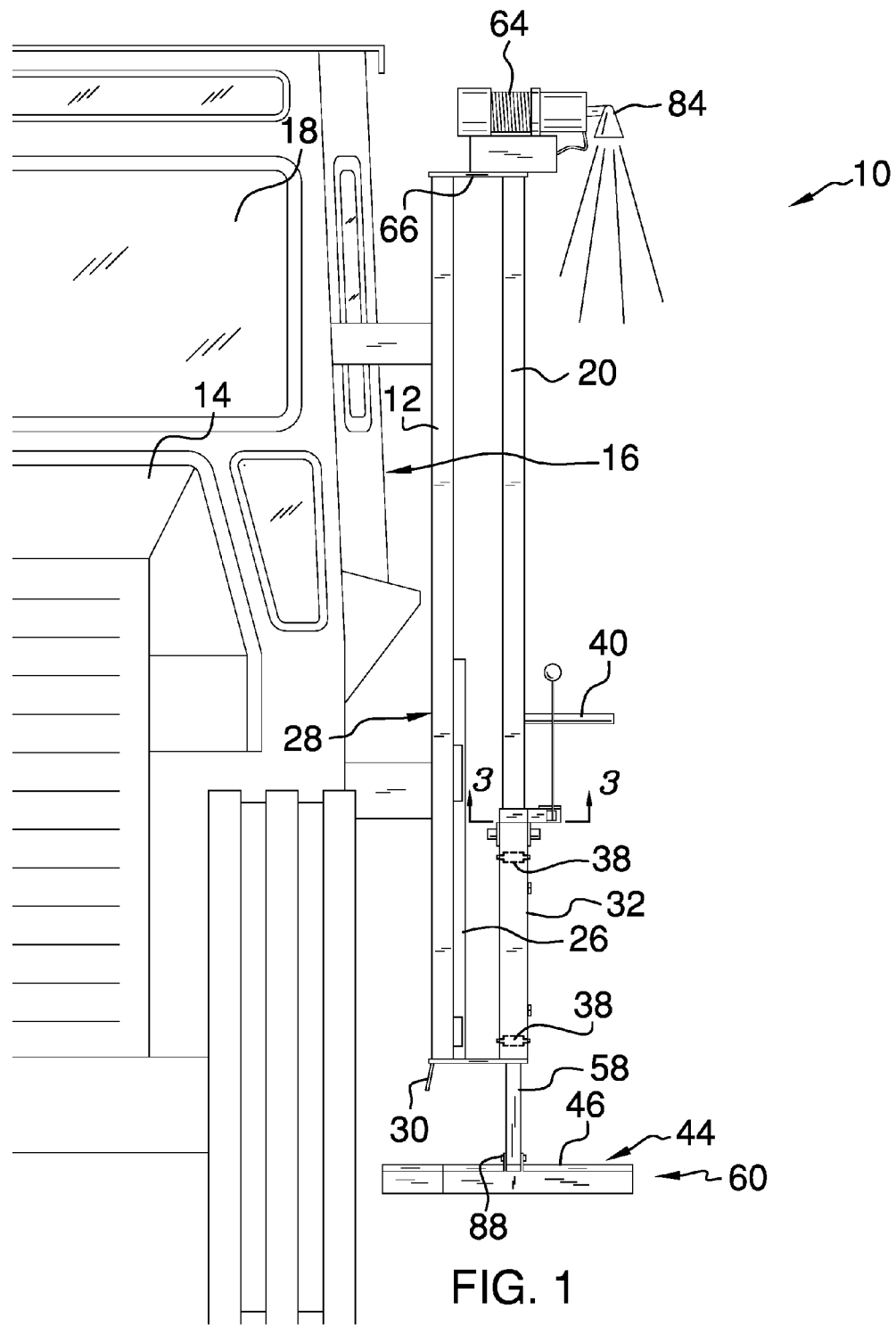
FIG. 1 is a front side perspective view of a driver lift device according to an embodiment of the disclosure.
Figure 2:
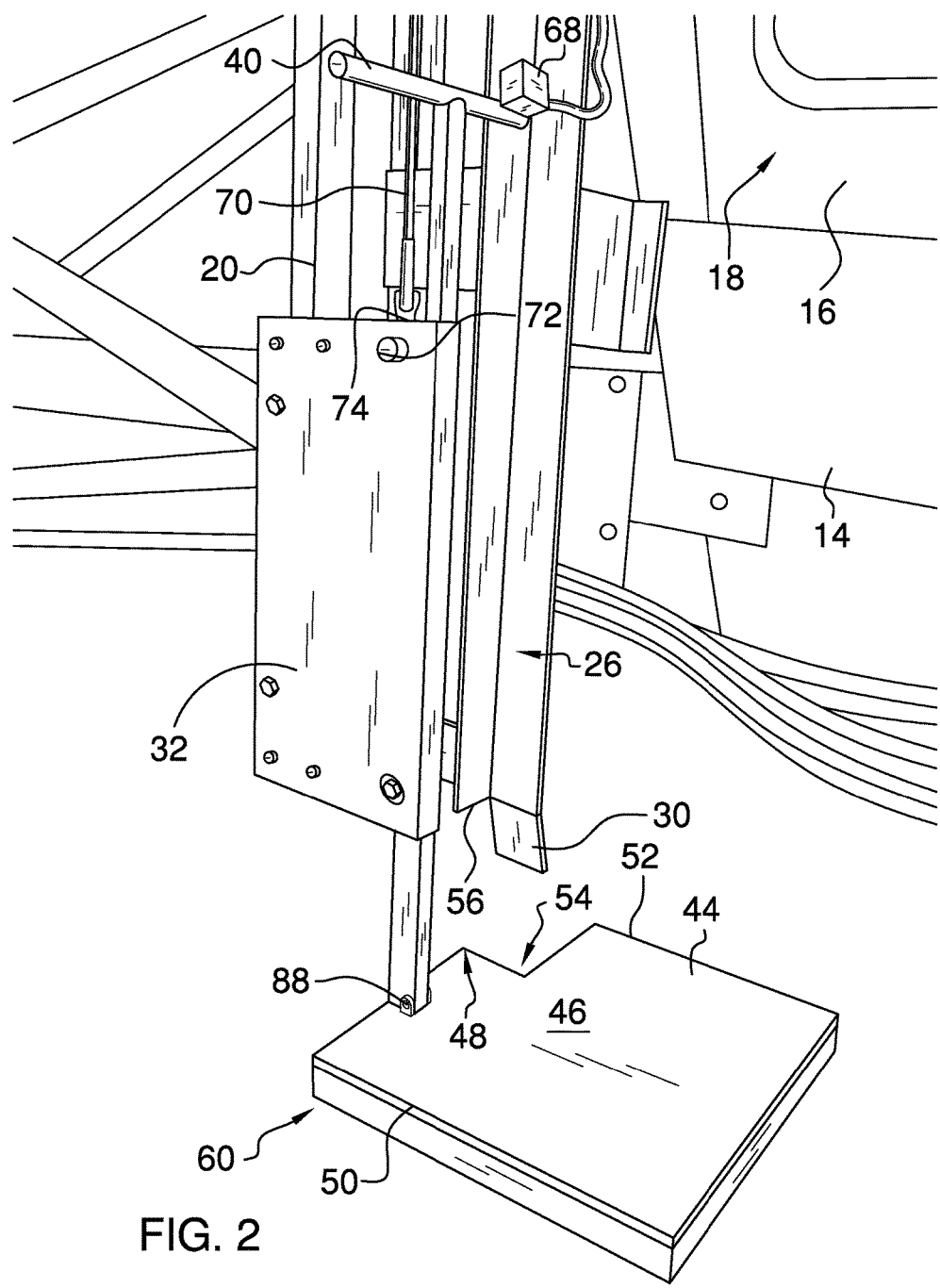
FIG. 2 is a partial back side perspective view of an embodiment of the disclosure.
Figure 3:
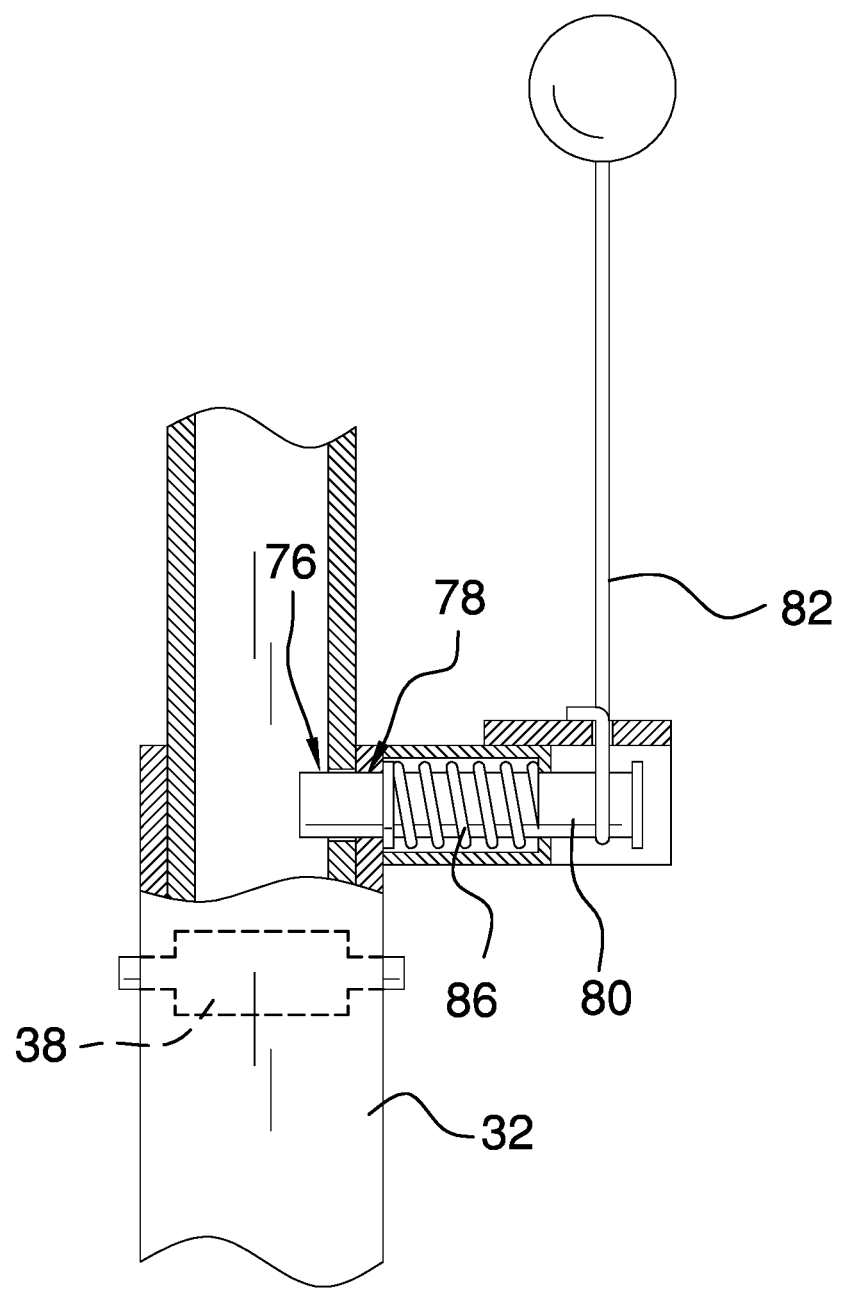
FIG. 3 is a cross-sectional view of an embodiment of the disclosure taken along line 3-3 of FIG. 1.
Figure 4:
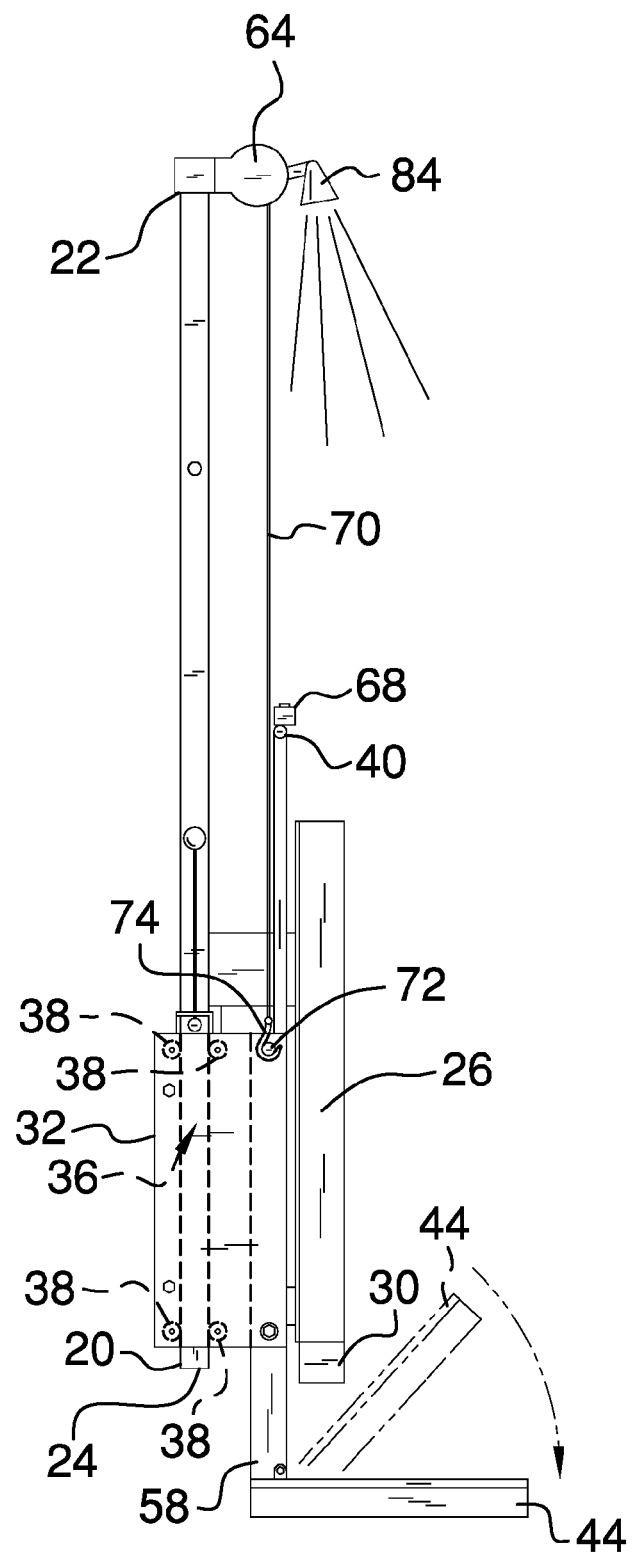
FIG. 4 is a side view of an embodiment of the disclosure.

With reference now to the drawings, and in particular to FIGS. 1 through 4 thereof, a new lift device embodying the principles and concepts of an embodiment of the disclosure and generally designated by the reference numeral 10 will be described.

As best illustrated in FIGS. 1 through 4, the driver lift device 10 generally comprises an elongated post 12 wherein the post is configured for being vertically mounted to a vehicle 14 proximate an entry 16 into a cab 18 of the vehicle 14. An elongated pole 20 has a polygonal cross-sectional shape transverse to a longitudinal axis of the pole 20. Each of a top end 22 and a bottom end 24 of the pole 20 is coupled to the post 12 such that the pole 20 is positioned in parallel spaced relationship to the post 12. A brace 26 is coupled to the post 12. The brace 26 is positioned in spaced parallel relationship to the post 12. The brace 26 is elongated and has a length less than a length of the post 12 such that the brace 26 provides stiffness and support for the post 12. The brace 26 is positioned in alignment with a bottom section 28 of the post 12 such that the brace 26 does not obscure or obstruct a driver's normal view out of the cab 18 of the vehicle 14. The brace 26 has an L-shaped cross sectional shape transverse to a longitudinal axis of the brace 26. The brace 26 has an outwardly directed tab 30 extending from one flange 32 of the brace 26 for reasons to be set forth in greater detail below.

A housing 32 has a pair of opposed walls 34 defining an interior space 36 therebetween. Each of a plurality of rollers 38 is coupled to the housing 32. Each of the rollers 38 extends between the opposed walls 34 of the housing 32. The rollers 38 define a vertical path through the housing 32. The pole 20 extends through the vertical path such that the housing 32 is movable along the pole 20. A handle 40 is coupled to and extends from the housing 32. A foot support 44 is coupled to the housing 32. The foot support 44 comprises a planar upper surface 46 and a corner 48 is inset between opposite side edges 50,52 of the foot support 44 defining an alignment guide 54. The alignment guide 54 is vertically aligned with the brace 26 such that the alignment guide 54 is complementary to and slides along the brace 26 when the housing 32 is elevated and lowered. The foot support 44 is lowerable to a position vertically spaced below a base end 56 of the brace 26 wherein the tab 30 facilitates positioning of the alignment guide 54 relative to the brace 26 as the foot support 44 is elevated towards the base end 56 of the brace 26. An extension 58 is coupled between the foot support 44 and the housing 32 such that the foot support 44 is positioned vertically below the housing 32 and the bottom end 24 of the pole 20 when the housing 32 is in a fully lowered position 60. The foot support 44 is pivotably coupled to a bottom end 62 of the extension 58 by a hinge 88.

A winch 64 is coupled to the top end 22 of the pole 20. An upper plate 66 is coupled to and extends between the post 12 and the top end 22 of the pole 20. The winch 64 is coupled to and positioned on a top surface 66 of the upper plate 66. A control 68 is coupled to the handle 40. The control 68 is operationally coupled to the winch 64 wherein operation of the winch 64 is controlled by manipulation of the control 68. A strap 70 is coupled to and extends between the winch 64 and the housing 32 wherein operation of the winch 64 elevates and lowers the foot support 44 on the pole 20. A pin 72 is coupled to the housing 32. The pin 72 is positioned in the interior space 36 of the housing 32 perpendicular to the pole 20. A hook 74 is coupled to the strap 70. The hook 74 is removably engageable to the pin 72 wherein the strap 70 is removably coupled to the housing 32 and retraction of the strap 70 by the winch 64 elevates the foot support 44. A hole 76 extends through the pole 20. The hole 76 is positioned proximate the top end 22 of the pole 20. An aperture 78 extends through the housing 32. The aperture 78 is positionable to align with the hole 76 when the housing 32 is elevated. A locking pin 80 is insertable through the aperture 78 and the hole 76 wherein the housing 32 is inhibited from sliding along the pole 20. The locking pin 80 is slidably coupled to the housing 32 in alignment with the aperture 78. The locking pin 80 is biased by a spring 86 to extend towards engagement with the pole 20. A grip 82 is coupled to and extends from the locking pin 80 wherein the grip 82 is configured for facilitating manipulation of the locking pin 80 to slidably disengage from the hole 76 in the pole 20.

A light 84 is coupled to the winch 64 and extends laterally outward from the winch 64. The light 84 is directed generally downward and towards the foot support 44. The light 84 may be conventionally wired and operated using a switch accessible remotely or while standing on the foot support 44.

In use, the foot support 44 is extended downwardly to allow a person to comfortably step onto the foot support 44. The person then manipulates the control 68 to elevate the foot support 44 and lift the person to a position where they can comfortably enter the cab 18 of the vehicle 14. The housing 32 and foot support 44 are held in the elevated position during use of the vehicle 14. Upon exiting the cab 18, the person manipulates the grip 82 allowing for lowering of the foot support 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A driver lift device comprising:
a post, said post being elongated wherein said post is configured for being vertically mounted to a vehicle proximate an entry into a cab of the vehicle;
a pole, said pole being elongated, a top end and a bottom end of said pole each being coupled to said post such that said pole is positioned in parallel spaced relationship to said post;
a housing having a pair of opposed walls defining an interior space therebetween;
a plurality of rollers coupled to said housing, each of said rollers extending between said opposed walls of said housing, said rollers defining a vertical path through said housing, said pole extending through said vertical path such that said housing is movable along said pole;
a foot support coupled to said housing, said foot support comprising a corner being inset between opposite side edges of said foot support defining an alignment guide;
a winch coupled to said top end of said pole;
a strap coupled to and extending between said winch and said housing wherein operation of said winch elevates and lowers said foot support on said pole; and
a brace coupled to said post, said brace being positioned in spaced parallel relationship to said post, said brace being elongated, said brace having a length less than a length of said post, said brace having an L-shaped cross sectional shape transverse to a longitudinal axis of said brace, said alignment guide being vertically aligned with said brace such that said alignment guide is complementary to and slides along said brace when said tube is elevated and lowered.

2. The device of claim 1, further comprising:
a pin coupled to said housing, said pin being positioned in said interior space of said housing perpendicular to said pole; and
a hook coupled to said strap, said hook being removably engageable to said pin wherein said strap is removably coupled to said housing and retraction of said strap by said winch elevates said foot support.

3. The device of claim 1, further comprising said foot support being lowerable to a position vertically spaced below a base end of said brace, said brace having an outwardly directed tab extending from one flange of said brace wherein said tab facilitates positioning of said alignment guide relative to said brace as said foot support is elevated towards said base end of said brace.

4. The device of claim 1, further comprising a handle coupled to and extending from said housing.

5. The device of claim 4, further comprising a control coupled to said handle, said control being operationally coupled to said winch wherein operation of said winch is controlled by manipulation of said control.

6. The device of claim 1, further comprising an upper plate coupled to and extending between said post and said top end of said pole, said winch being coupled to and positioned on a top surface of said plate.

7. The device of claim 1, further comprising an extension coupled between said foot support and said housing such that said foot support is positioned vertically below said housing and said bottom end of said pole when said housing is in a fully lowered position.

8. The device of claim 7, further comprising said foot support being pivotably coupled to a bottom end of said extension.

9. The device of claim 1, further comprising said pole having a rectangular cross-sectional shape perpendicular to a longitudinal axis of said pole, said rollers being arranged into spaced pairs defining a complementary shape for receiving said pole such that said housing is inhibited from twisting relative to said pole.

10. The device of claim 1, further comprising:
a hole extending through said pole, said hole being positioned proximate said top end of said pole;
an aperture extending through said housing, said aperture being positionable to align with said hole when said housing is elevated; and
a locking pin insertable through said aperture and said hole wherein said housing is inhibited from sliding along said pole.

11. The device of claim 10, further comprising:
said locking pin being slidably coupled to said housing in alignment with said aperture; and
a grip coupled to and extending from said locking pin wherein said grip is configured for facilitating manipulation of said locking pin.

12. The device of claim 11, further comprising said locking pin being biased to extend towards engagement with said pole.

13. The device of claim 1, further comprising a light coupled to said winch, said light being directed downwardly towards said foot support.

14. The device of claim 1, further comprising a remote control, said winch being operable by manipulation of said remote control.

15. A driver lift device comprising:
- a post, said post being elongated wherein said post is configured for being vertically mounted to a vehicle proximate an entry into a cab of the vehicle;
- a pole, said pole being elongated, said pole having a polygonal cross-sectional shape transverse to a longitudinal axis of said pole, a top end and a bottom end of said pole each being coupled to said post such that said pole is positioned in parallel spaced relationship to said post;
- a brace coupled to said post, said brace being positioned in spaced parallel relationship to said post, said brace being elongated, said brace having a length less than a length of said post, said brace having an L-shaped cross sectional shape transverse to a longitudinal axis of said brace, said brace having an outwardly directed tab extending from one flange of said brace;
- a housing having a pair of opposed walls defining an interior space therebetween;
- a plurality of rollers coupled to said housing, each of said rollers extending between said opposed walls of said housing, said rollers defining a vertical path through said housing, said pole extending through said vertical path such that said housing is movable along said pole;
- a handle coupled to and extending from said housing;
- a foot support coupled to said housing, said foot support comprising a planar upper surface and a corner being inset between opposite side edges of said foot support defining an alignment guide, said alignment guide being vertically aligned with said brace such that said alignment guide is complementary to and slides along said brace when said housing is elevated and lowered, said foot support being lowerable to a position vertically spaced below a base end of said brace wherein said tab facilitates positioning of said alignment guide relative to said brace as said foot support is elevated towards said base end of said brace;
- an extension coupled between said foot support and said housing such that said foot support is positioned vertically below said housing and said bottom end of said pole when said housing is in a fully lowered position, said foot support being pivotably coupled to a bottom end of said extension;
- a winch coupled to said top end of said pole;
- an upper plate coupled to and extending between said post and said top end of said pole, said winch being coupled to and positioned on a top surface of said plate;
- a control coupled to said handle, said control being operationally coupled to said winch wherein operation of said winch is controlled by manipulation of said control;
- a strap coupled to and extending between said winch and said housing wherein operation of said winch elevates and lowers said foot support on said pole;
- a pin coupled to said housing, said pin being positioned in said interior space of said housing perpendicular to said pole;
- a hook coupled to said strap, said hook being removably engageable to said pin wherein said strap is removably coupled to said housing and retraction of said strap by said winch elevates said foot support;
- a hole extending through said pole, said hole being positioned proximate said top end of said pole;
- an aperture extending through said housing, said aperture being positionable to align with said hole when said housing is elevated;
- a locking pin insertable through said aperture and said hole wherein said housing is inhibited from sliding along said pole, said locking pin being slidably coupled to said housing in alignment with said aperture, said locking pin being biased to extend towards engagement with said pole; and
- a grip coupled to and extending from said locking pin wherein said grip is configured for facilitating manipulation of said locking pin to slidably disengage from said hole in said pole.

* * * * *